United States Patent
Blanchard et al.

(10) Patent No.: US 9,562,800 B2
(45) Date of Patent: Feb. 7, 2017

(54) FLOAT GAUGE ASSEMBLY FOR STORAGE TANKS

(71) Applicant: Marshall Excelsior Co., Marshall, MI (US)

(72) Inventors: Frederick W. Blanchard, Battle Creek, MI (US); Alex L. Hoffman, Bellevue, MI (US)

(73) Assignee: MARSHALL EXCELSIOR CO., Marshall, MI (US)

(*) Notice: Subject to any disclaimer, the term of this patent is extended or adjusted under 35 U.S.C. 154(b) by 202 days.

(21) Appl. No.: 14/207,793

(22) Filed: Mar. 13, 2014

(65) Prior Publication Data

US 2014/0260603 A1  Sep. 18, 2014

Related U.S. Application Data

(60) Provisional application No. 61/782,895, filed on Mar. 14, 2013.

(51) Int. Cl.
*G01F 23/34* (2006.01)

(52) U.S. Cl.
CPC ................... *G01F 23/34* (2013.01)

(58) Field of Classification Search
USPC .............. 73/290 R, 305, 317, 322.5
See application file for complete search history.

(56) References Cited

U.S. PATENT DOCUMENTS

| | | | |
|---|---|---|---|
| 4,635,480 A * | 1/1987 | Hrncir et al. ............... 73/322.5 |
| 5,095,933 A * | 3/1992 | Olejak ........................ 137/207 |
| 5,585,786 A * | 12/1996 | Clark et al. ................... 340/623 |
| 5,950,487 A * | 9/1999 | Maresca et al. .............. 73/293 |
| 6,170,328 B1 * | 1/2001 | Ross et al. .................... 73/305 |
| 6,253,609 B1 * | 7/2001 | Ross et al. .................... 73/305 |
| 6,289,728 B1 * | 9/2001 | Wilkins ....................... 73/149 |
| 7,219,686 B2 * | 5/2007 | Schmitz et al. ............. 137/413 |
| 7,240,690 B2 * | 7/2007 | Schmitz et al. ............. 137/413 |
| D666,933 S | 9/2012 | Hoffman et al. |
| D671,022 S | 11/2012 | Hoffman et al. |
| 2002/0189347 A1 * | 12/2002 | Caldwell ...................... 73/319 |
| 2003/0177828 A1 * | 9/2003 | Bedard et al. ................ 73/313 |
| 2007/0181585 A1 * | 8/2007 | Lane ........................ 220/592.16 |
| 2012/0260730 A1 * | 10/2012 | Ross, Jr. ....................... 73/317 |
| 2015/0177050 A1 * | 6/2015 | Taylor ......................... 73/305 |

* cited by examiner

*Primary Examiner* — Eric S McCall
(74) *Attorney, Agent, or Firm* — Howard & Howard Attorneys PLLC (57) ABSTRACT

A float gauge assembly for a storage tank having a port with an opening includes a body for attachment to the port of the storage tank and a gauge mountable to the body, the gauge having a gauge face for indicating a level or amount of material present in the storage tank, a float mechanism mounted to the body and cooperating with the gauge, the float mechanism including a float movable relative to the body in an operating position, the float being sized so that the float is unable to be inserted into the storage tank though the opening in the port, and a tube coupled to the float and having a dimension sized for inserting through the opening in the port, and an alignment element configured to rotationally fix the tube to the body when the float is in the operating position so that the gauge face accurately indicates the level of material in the storage tank when mounted to the body.

20 Claims, 7 Drawing Sheets

FLOAT GAUGE ASSEMBLY FOR STORAGE TANKS

CROSS-REFERENCE TO RELATED APPLICATION(S)

The present invention claims priority to and the benefit of U.S. Provisional Patent Application Ser. No. 61/782,895, filed Mar. 14, 2013, which is hereby incorporated by reference in its entirety.

BACKGROUND OF THE INVENTION

1. Field of the Invention

The present invention relates generally to gauge assemblies and, more particularly to, a float gauge assembly used for storage tanks.

2. Description of the Related Art

Storage tanks for fluids such as liquefied petroleum gas (LPG) and anhydrous ammonia (NH3) commonly have rotary gauges for detecting a level of material stored in the storage tank. Often, these rotary gauges are attached to the storage tanks at small openings into the storage tank such as a 1" National Pipe Thread (NPT) opening. Lately, there has been a desire to replace such rotary gauges with float gauges. However, in order to replace the rotary gauge with a float gauge, the float gauge must also fit into the same small opening. Therefore, there is a need in the art for a float gauge that is capable of fitting to storage tanks with small openings.

SUMMARY OF THE INVENTION

Accordingly, the present invention provides a float gauge assembly for a storage tank having a port with an opening. The float gauge assembly includes a body for attachment to the port of the storage tank and a gauge mountable to the body. The gauge has a gauge face for indicating a level or amount of material present in the storage tank. The float gauge assembly also includes a float mechanism mounted to the body and cooperating with the gauge. The float mechanism includes a float movable relative to the body in an operating position, the float being sized so that the float is unable to be inserted into the storage tank though the opening in the port, and a tube coupled to the float and having a dimension sized for inserting through the opening in the port. The float gauge assembly further includes an alignment element configured to rotationally fix the tube to the body when the float is in the operating position so that the gauge face accurately indicates the level or amount of material in the storage tank when mounted to the body.

One advantage of the present invention is that a new float gauge assembly is provided for a storage tank. Another advantage of the present invention is that the float gauge assembly may be used to replace a rotary gauge. Yet another advantage of the present invention is that the float gauge assembly is capable of fitting to storage tanks with small openings. Still another advantage of the present invention is that the float gauge assembly includes an alignment element configured to rotationally fix the assembly to the opening when a float is in the operating position so that a gauge face accurately indicates a level or amount of material in a storage tank when mounted to the opening.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
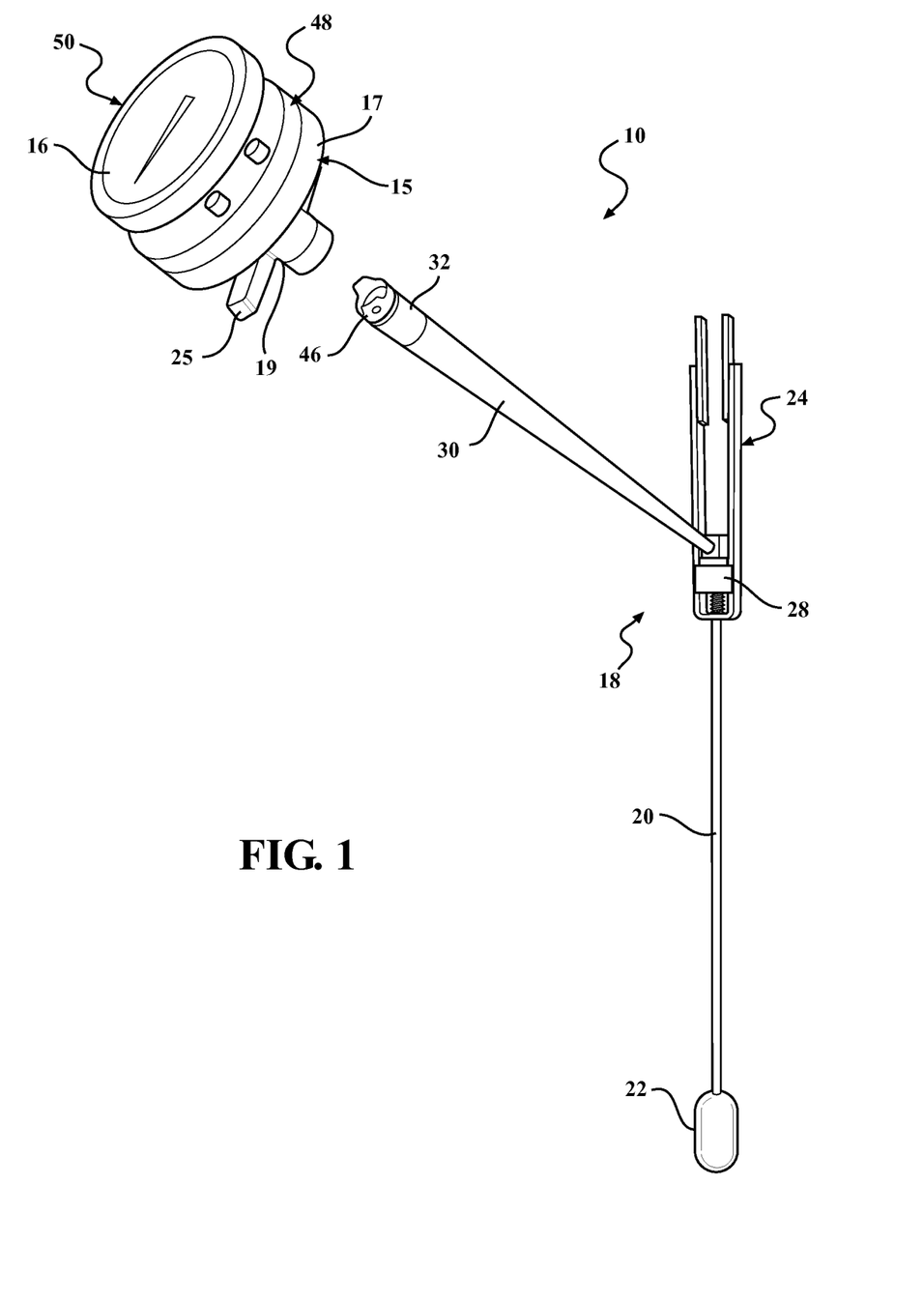
FIG. 1 is a perspective view of one embodiment of a float gauge assembly, according to the present invention, illustrating a float mechanism separated from a gauge assembly.
Figure 1A:
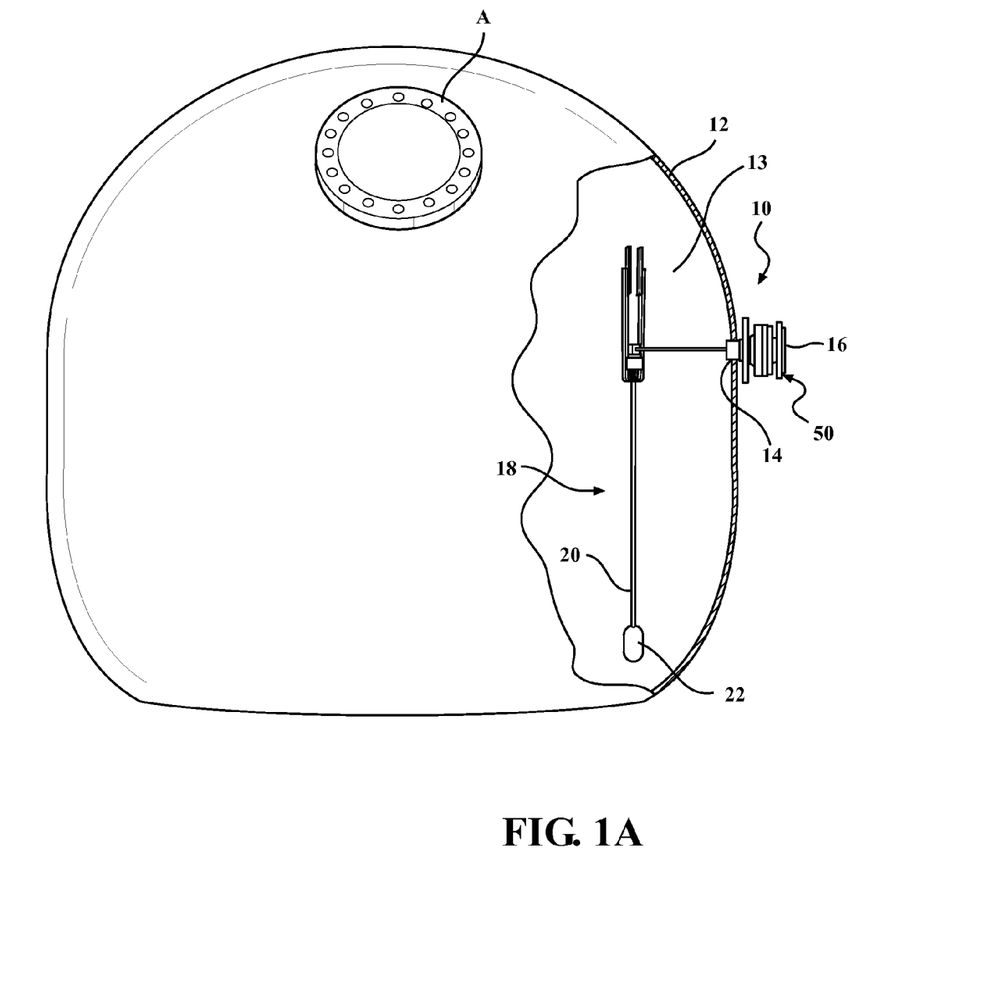
FIG. 1A is a fragmentary view of the float gauge assembly of FIG. 1, illustrated with positioning of the float gauge assembly in a storage tank with a man-way access A.
Figure 2:
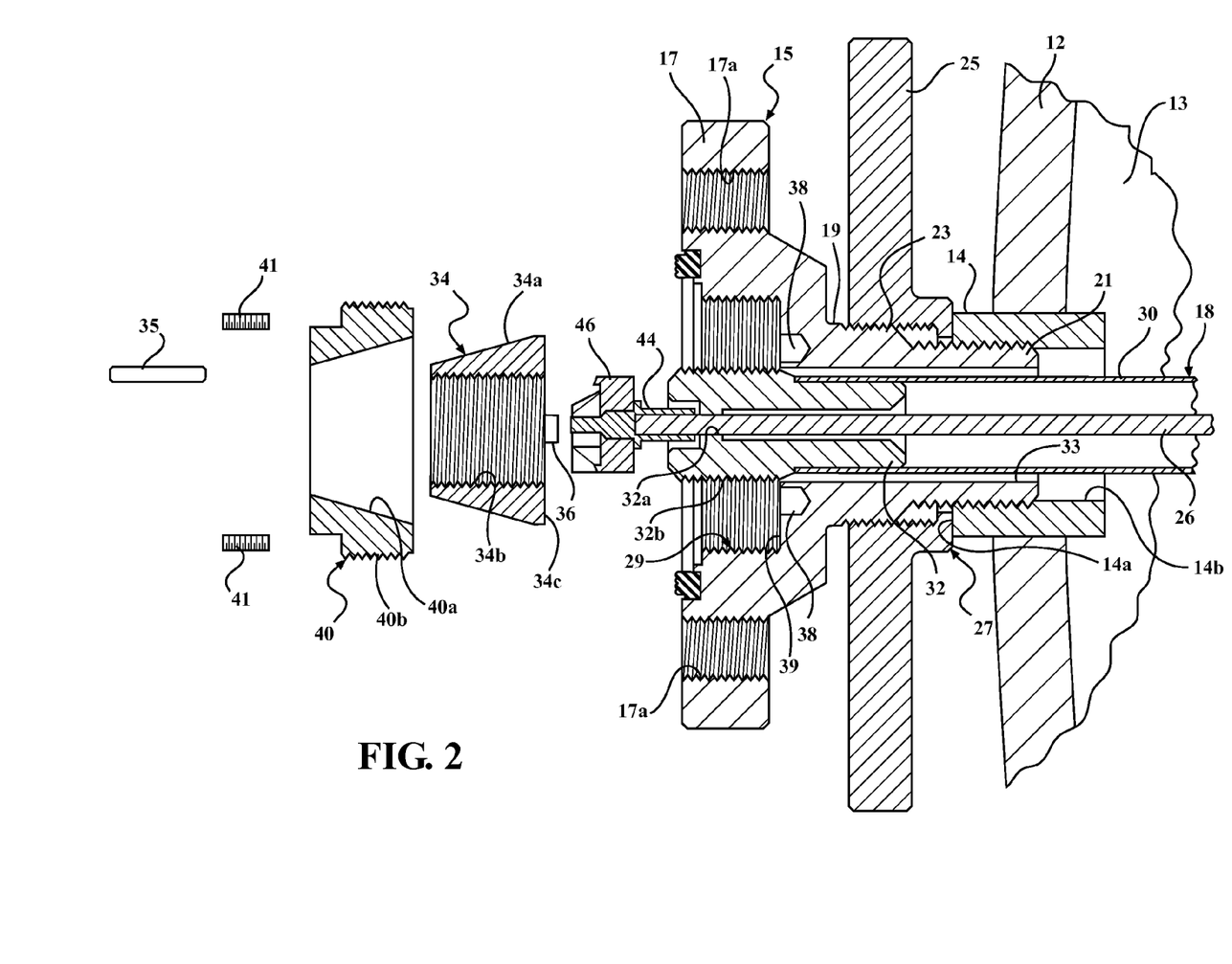
FIG. 2 is a partial sectional and exploded view of the float gauge assembly of FIG. 1.
Figure 2A:
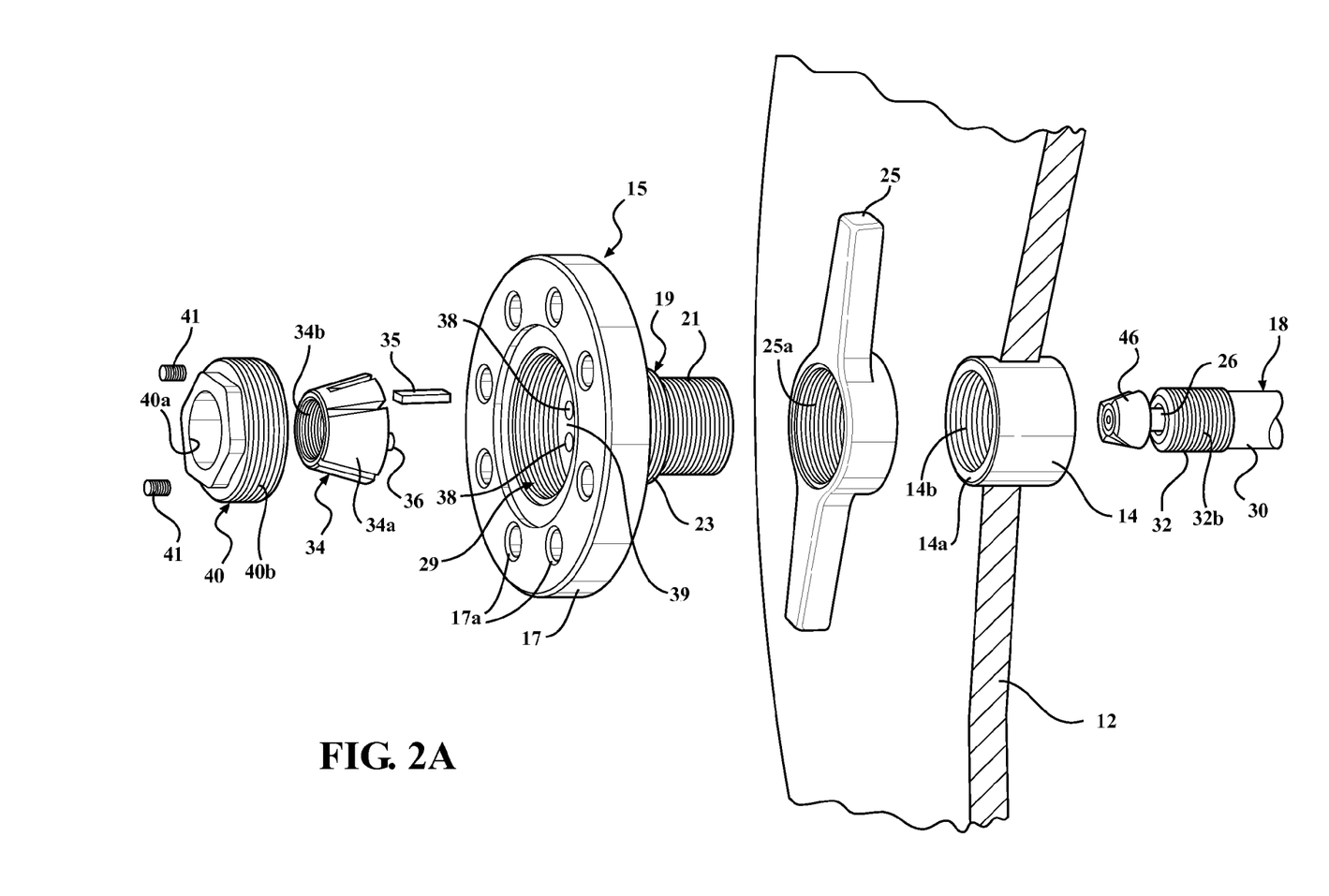
FIG. 2A is a partial exploded view of the float gauge assembly of FIG. 1.

Referring to the drawings and in particular FIGS. 1 and 1A, one embodiment of a float gauge assembly 10, according to the present invention, is shown. In the embodiment illustrated in FIG. 1A, the float gauge assembly 10 is attached to a storage tank 12 to detect and indicate a level or amount of material stored in an interior 13 of the storage tank 12, e.g., percent of tank volume from 0 to 100 percent. It should be appreciated that the float gauge assembly 10 can be used with any stored material suitable for float gauges, but is often used for storage tanks containing LPG and NH3.

The storage tank 12 has a man-way access A that allows an installer of the float gauge assembly 10 to enter the interior 13 of the storage tank 12. The storage tank 12 also has an internally threaded port 14 that opens into the interior 13 of the storage tank 12 from outside. The float gauge assembly 10 is attached to the storage tank 12 through the port 14 so that a gauge face 16 of the float gauge assembly 10 can be viewed from outside the storage tank 12 to determine the level of material inside the storage tank 12. In one embodiment, the port 14 has a 1 inch NPT opening. In other embodiments, the port 14 has different sized openings.

Figure 3:
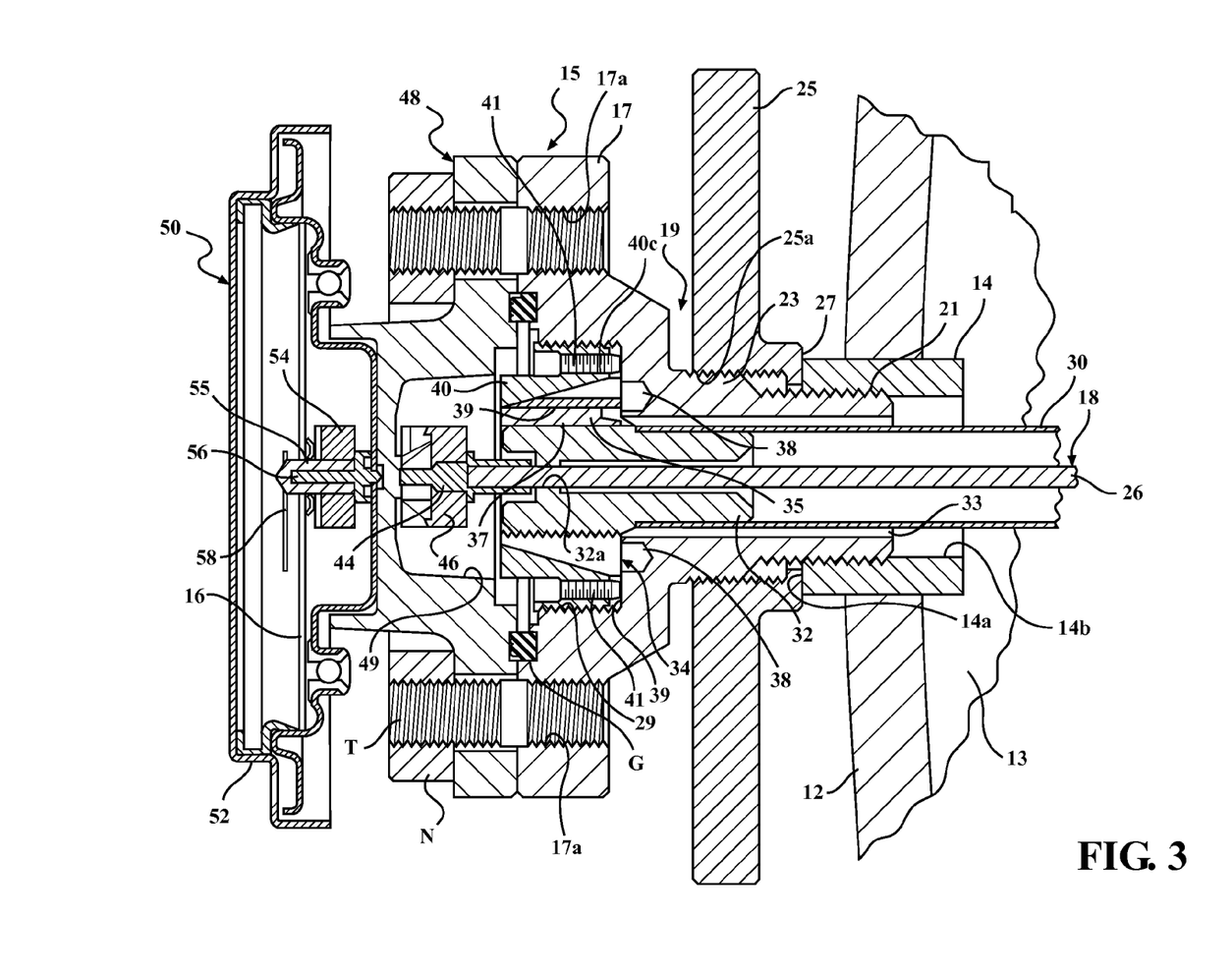
FIG. 3 is a partial sectional view of the float gauge assembly of FIG. 1.
Figure 4:
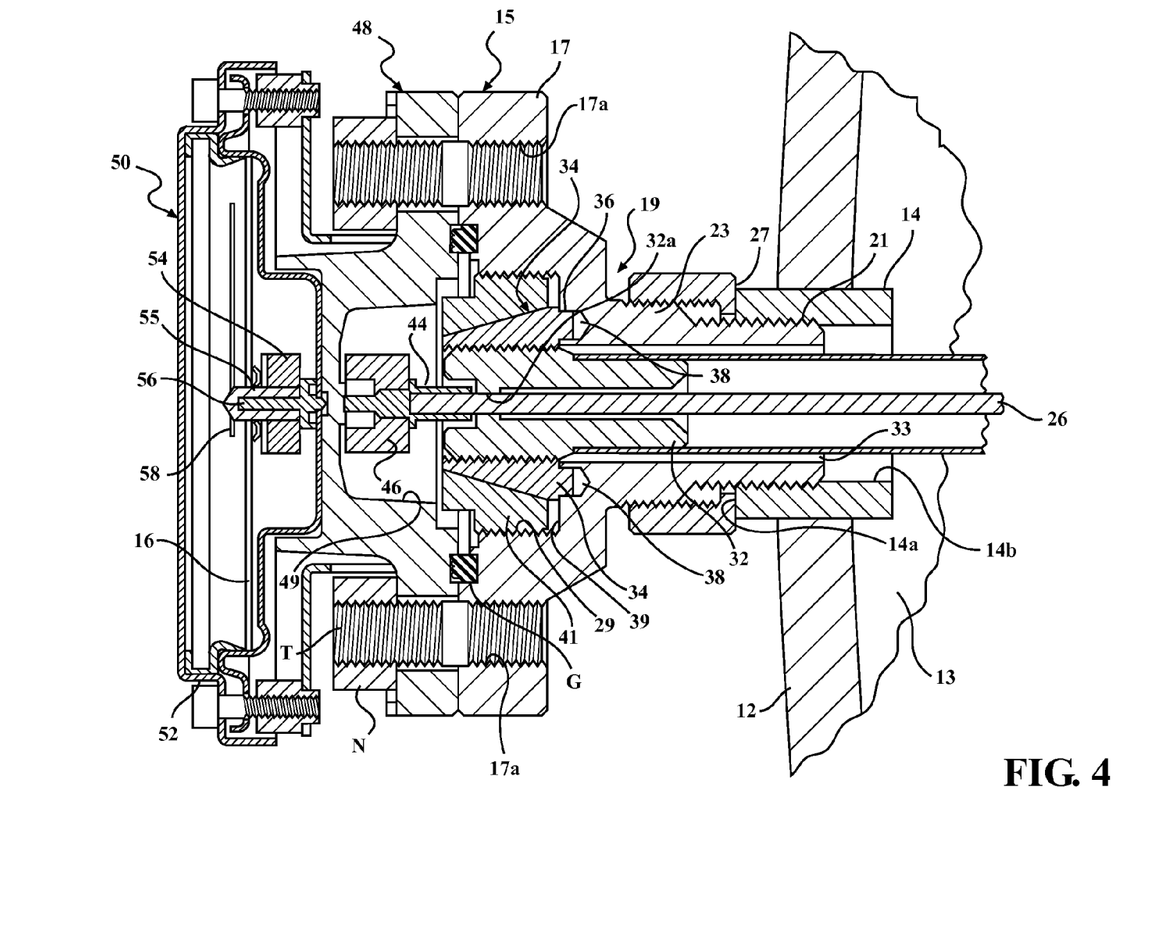
FIG. 4 is a partial sectional view of the float gauge assembly of FIG. 1.
Figure 5:
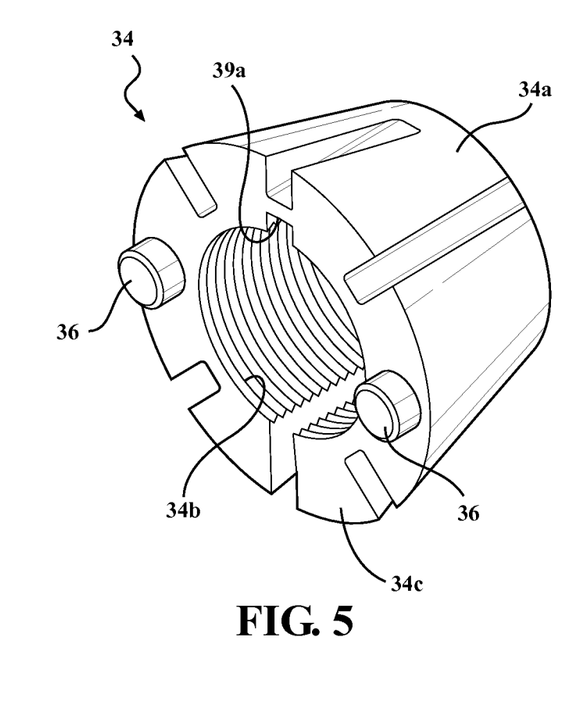
FIG. 5 is a perspective view of a collar of the float gauge assembly of FIG. 1.
Figure 6:
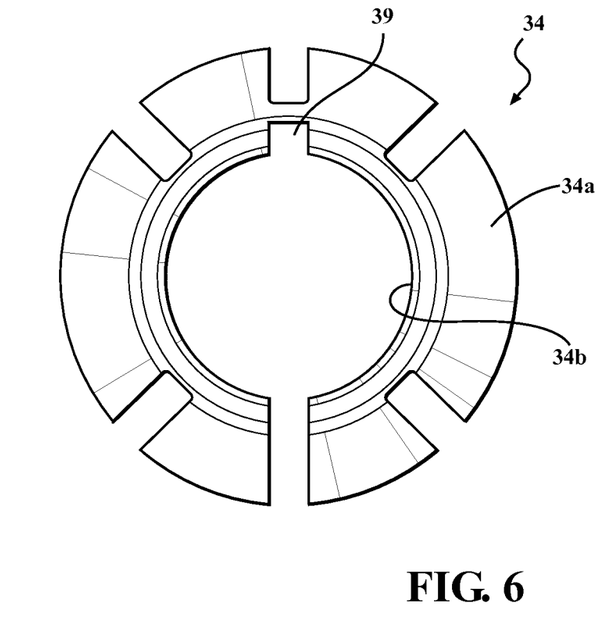
FIG. 6 is a front view of the collar of FIG. 5.

Referring to FIGS. 1 through 4, the float gauge assembly 10 includes a flange body, generally indicated at 15, fitted to the port 14. The flange body 15 has a flange 17 with a plurality of circumferentially spaced openings 17a for fasteners 49 (FIG. 3). In the embodiment illustrated, there are eight (8) equally circumferentially spaced openings 17a. The flange body 15 also has a neck 19 extending rearward from the flange 17. The neck 19 has a first tubular portion 21 with a first diameter and a second tubular portion 23 with a second diameter greater than the first diameter. The first tubular portion 21 is externally threaded for inserting into the internally threaded port 14. The second tubular portion 23 is externally threaded. The flange body 15 is made of a metal material. The flange body 15 is integral, unitary, and one-piece.

The float gauge assembly 10 also includes a threaded nut 25 having a threaded internal bore 25a that, when the flange body 15 is threaded into the port 14, is unthreaded relative to the flange body 15 so as to bear against an outer surface 14a of the port 14. The threaded nut 25 is shown as a wing nut that has a bearing surface 27 that contacts and bears against the outer surface 14a of the port 14 to further secure the flange body 15 to the port 14. During installation, the flange body 15 is oriented relative to the storage tank 12 so that two of the openings 17a for fasteners are located at diametrically opposed nine o'clock and three o'clock positions (see FIG. 4). It should be appreciated that the threaded internal bore 25a threadably engages the threaded second tubular portion 23.

The float gauge assembly 10 also includes a float mechanism, generally indicated at 18, that operates to detect changes in the level or amount of material in the interior 13 of the storage tank 12. The float mechanism 18 includes a float arm 20 and a float 22 is connected to the float arm 20 at a first end. The float arm 20 and float 22 move relative to the flange body 15 when in an operating position. The float mechanism 18 also includes a counterbalance assembly, generally indicated at 24, attached to the float arm 20 at a second end. The float mechanism 18 further includes a drive shaft 26 and a gear box 28 to rotatably drive the drive shaft 26 through the gear box 28 as the float 22 is raised or lowered by the material in the interior 13 of the storage tank 12 as the level of the material in the interior 13 of the storage tank 12 is raised or lowered. The drive shaft 26 extends from the gear box 28 and the gear box 28 is connected to the float arm 20. The float mechanism 20 also includes a tube 30 coaxially surrounding the drive shaft 26. The tube 30 is sized for insertion through the port 14. The tube 30 has a diameter smaller than a diameter of an opening 14b in the port 14. The drive shaft 26 rotates within the tube 30. It should be appreciated that the float arm 20 pivots about a pivot axis relative to tube 30 when raised or lowered, as is conventional in the art.

In some embodiments, the float 22 is sized such that the float 22 is unable to be inserted into the interior 13 of the storage tank 12 through the opening 14b of the port 14. The float 22 has a length and a width with the width being larger than a diameter of the opening 14b through the port 14. As a result, the float mechanism 18 must be first inserted into the interior 13 of the storage tank 12 through the man-way access A.

The tube 30 has a connector 32 opposite the gear box 28 and integrally formed with the rest of the tube 30. The connector 32 defines a central bore 32a through which the drive shaft 26 extends to protrude forward from the connector 32. The connector 32 has a threaded outer surface 32b. During assembly, the installer enters the interior 13 of the storage tank 12 through the man-way access A. The installer then inserts the connector 32 (and additional portions of tube 30) through a central throughbore 33 of the flange body 15—the flange body 15 already being attached to the port 14. The connector 32 is inserted through the central throughbore 33 so that the connector 32 protrudes into a threaded pocket 29 defined in the flange body 15.

Referring to FIGS. 2 through 6, the float gauge assembly 10 includes a collar, generally indicated at 34, having a frustoconical outer surface 34a and a threaded internal bore 34b threaded onto the threaded outer surface 32b of the connector 32. The collar 34 is sized so that, once threaded to the connector 32, the connector 32 is unable to slide back through the central throughbore 33 in the flange body 15. Once the collar 34 is secured to the connector 32, the installer is no longer needed inside the interior 13 of the storage tank 12 and the remaining installation can occur outside of the storage tank 12.

The float gauge assembly 10 also includes a key 35 and the connector 32 and collar 34 have opposing keyways 37, 39a for receiving the key 35 to rotationally lock the collar 34 to the connector 32. The key 35 and keyways 37, 39a are generally rectangular in shape, but may have any suitable shape. The keyways 37, 39a extend axially along the threaded internal bore 34b. The keyway 37 for the connector 32 is located at the twelve o'clock position circumferentially about the connector 32 when the float mechanism 18 is in an optimal operating position, e.g., freely hanging downwardly under the force of gravity in an empty storage tank 12. Once the collar 34 has been substantially threaded onto the connector 32, and the keyways 37, 39a aligned, the key 35 is inserted into the keyways 37, 39a to rotationally lock the collar 34 to the connector 32.

The collar 34 has a rear surface 34c and at least one, preferably a pair of alignment elements that protrude rearwardly from the rear surface 34c. In the embodiment illustrated, the alignment elements are pins 36 that are diametrically opposed to one another. The pins 36 are generally cylindrical in shape, but may have any suitable shape. When the collar 34 is keyed to the connector 32, and the float mechanism 18 is in an operating position, the pins 36 are located at nine o'clock and three o'clock positions on the collar 34. It should be appreciated that the pins 36 may be integral, unitary, and one-piece with the collar 34.

During assembly, after the collar 34 is attached to the connector 32 and keyed together, the float mechanism 18 is allowed to hang down under the force of gravity to assume its optimal operating position. This rotationally orients the collar 34/connector 32 relative to the flange body 15 so that the pins 36 are located at nine o'clock and three o'clock positions (see FIG. 4). When the float mechanism 18 has settled into its optimal operating position while hanging down under the force of gravity, the position of the pins 36 is ascertained relative to a plurality of matingly shaped and sized bores 38 defined in a shoulder surface 39 of the flange body 15 opposite the pins 36. There are preferably eight (8) bores 38 that correspond in clock position to the eight openings 17a in the flange 17. Two of the bores 38 are oriented in the nine o'clock and three o'clock positions if the flange openings 17a were properly oriented. The pins 36 are then selectively inserted into two of the bores 38 that most closely match the rotational position of the pins 36 when the float mechanism 18 is in its optimal operating position—which in a desired installation will be the two bores 38 at the nine o'clock and three o'clock positions. This will ultimately align the gauge face 16 properly with respect to the float mechanism 18. It should be understood that the float mechanism 18 is operational in other operating positions other than its optimal operating position and deviations from the optimal operating position are within the scope of this invention.

The float gauge assembly 10 also includes a retainer, generally indicated at 40, to retain the collar 34 in position to the flange body 15. The retainer 40 has an inner frustoconical surface 40a for frictional sliding against the corresponding surface 34a of the collar 34 and an externally threaded outer surface 40b. Once the pins 36 are in mating engagement with the flange body 15 via the bores 38, the retainer 40 is threaded into position over the collar 34. As the retainer 40, which is externally threaded, is threaded into the internally threaded pocket 29 of the flange body 15, the frustoconical inner surface 40a bears against the frustoconical outer surface 34a of the collar 34 to retain the collar 34 in position.

The float gauge assembly 10 further includes at least one, preferably a pair of fasteners. In one embodiment, the pair of fasteners is a pair of set screws 41 inserted into threaded bores 40c in the retainer 40. The set screws 41 are inserted after the retainer 40 is threaded into the internally threaded pocket 29 of the flange body 15. The set screws 41 further lock the retainer 40 in position by bearing against the shoulder surface 39 that defines a bottom of the internally threaded pocket 29 of the flange body 15.

The tube 30 is rigidly fixed to the flange body 15 to improve durability and accuracy. In particular, referring to FIGS. 5 and 6, the collar 34 has a collet-style flexible cross section (e.g., broken ring) that is compressed by the frusto-conical mating surfaces 34a and 40a of the collar 34 and retainer 40, respectively. It should be appreciated that this compression eliminates all clearance between the connecting threads of the collar 34 and the connector 32, thereby rigidly fixing tube 30 to the flange body 15.

The float gauge assembly 10 also includes a hub 44 fixed to an end of the drive shaft 26 opposite the gear box 28 and a magnet 46 fixed to the hub 44 to rotate with the drive shaft 26 as the drive shaft 26 is rotated by the float mechanism 18. The float gauge assembly 10 includes a second flange body, generally indicated at 48 (see FIG. 3), fastened to the flange body 15 by fasteners 49 (e.g., nuts N and threaded shafts T). The second flange body 48 includes a cavity 49 for receiving the magnet 46 fixed to the hub 44. The float gauge assembly 10 also includes a sealing member, e.g., a gasket G, disposed between the flange bodies 15, 48 to seal against leaks between the flange bodies 15, 48.

The float gauge assembly 10 further includes a gauge assembly, generally indicated at 50, mounted to the second flange body 48. The gauge assembly 50 includes a gauge housing 52 and the gauge face 16 disposed in the gauge housing 52. The gauge assembly 50 also includes a second magnet 54 disposed in the gauge housing 52 and a hub 55 that rotates about a pivot pin 56. The second magnet 54 is fixed to the hub 55. The second magnet 54 is aligned with the first magnet 46 so that rotation of the first magnet 46 results in like rotation of the second magnet 54. Thus, when the first magnet 46 rotates upon being driven by the float mechanism 18, the second magnet 54 similarly rotates. The gauge assembly 50 further includes a needle 58 fixed to the hub 55 to indicate on the gauge face 16 the level of material in the storage tank 12. Examples of suitable gauge assemblies are shown in U.S. Design Pat. No. D671,022 to Hoffman et al. and U.S. Pat. No. D666,933 to Hoffman et al., both of which are hereby incorporated by reference. It should be appreciated that the alignment elements, e.g., pins 36, act to properly align the float mechanism 18 with the gauge assembly 50 so that readings of the liquid level in the interior 13 of the storage tank 12 are accurate.

Embodiments of the present invention have been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A float gauge assembly for a storage tank having a threaded port with an opening, said float gauge assembly comprising:
   a body having a threaded portion for threaded attachment to the port of the storage tank and at least one bore;
   a gauge mountable to said body, said gauge having a gauge face for indicating a level of material present in the storage tank;
   a float mechanism mounted to said body and cooperating with said gauge, said float mechanism including a float movable relative to said body in an operating position, said float being sized so that said float is unable to be inserted into the storage tank though the opening in the port and a tube coupled to said float and having a dimension sized for inserting through the opening in the port and a float arm connected to said float and pivotally connected to said tube such that said float arm pivots about a pivot axis relative to said tube when raised or lowered;
   a connector at one end of said tube;
   a collar secured to said connector; and
   at least one alignment element protruding from said collar and received in said at least one bore and configured to rotationally fix said tube to said body when said float is in the operating position so that said gauge face accurately indicates the level of material in the storage tank when mounted to said body.

2. A float gauge assembly as set forth in claim 1 wherein said body has a throughbore extending axially therethrough to receive said tube and a threaded pocket at one end of said throughbore.

3. A float gauge assembly as set forth in claim 2 wherein said connector is disposed in said threaded pocket and having a threaded outer surface.

4. A float gauge assembly as set forth in claim 3 wherein said collar threadably engages said threaded outer surface of said connector.

5. A float gauge assembly as set forth in claim 4 wherein said collar has a rear surface and said at least one alignment element protrudes rearwardly from said rear surface.

6. A float gauge assembly for a storage tank having a port with an opening, said float gauge assembly comprising:
   a body for attachment to the port of the storage tank;
   a gauge mountable to said body, said gauge having a gauge face for indicating a level of material present in the storage tank;
   a float mechanism mounted to said body and cooperating with said gauge, said float mechanism including a float movable relative to said body in an operating position, said float being sized so that said float is unable to be inserted into the storage tank though the opening in the port and a tube coupled to said float and having a dimension sized for inserting through the opening in the port;
   at least one alignment element configured to rotationally fix said tube to said body when said float is in the operating position so that said gauge face accurately indicates the level of material in the storage tank when mounted to said body;
   said body having a throughbore extending axially therethrough to receive said tube and a threaded pocket at one end of said throughbore; and
   wherein said at least one alignment element comprises a pair of pins.

7. A float gauge assembly as set forth in claim 6 wherein said body includes a plurality of bores defined in said pocket of said body to receive said pins.

8. A float gauge assembly as set forth in claim 7 wherein said pins are selectively inserted into two of said bores that most closely match a rotational position of said pins when said float mechanism is in an operating position while hanging down under a force of gravity.

9. A float gauge assembly as set forth in claim 7 including a retainer threaded into said pocket over said collar once said pins are disposed in mating engagement with said bores in said body.

10. A float gauge assembly as set forth in claim 9 including a pair of fasteners threadably engaging said retainer to lock said retainer in position.

11. A float gauge assembly for a storage tank having a port with an opening, said float gauge assembly comprising:
- a body for attachment to the port of the storage tank, said body has a throughbore extending axially therethrough and a threaded pocket at one end of said throughbore;
- a connector disposed in said threaded pocket and having a threaded outer surface;
- a collar threadably engaging said threaded outer surface of said connector;
- a gauge mountable to said body, said gauge having a gauge face for indicating a level of material present in the storage tank;
- a float mechanism mounted to said body and cooperating with said gauge, said float mechanism including a float movable relative to said body in an operating position, said float being sized so that said float is unable to be inserted into the storage tank though the opening in the port and a tube coupled to said float and having a dimension sized for inserting through the opening in the port;
- at least one alignment element configured to rotationally fix said tube to said body when said float is in the operating position so that said gauge face accurately indicates the level of material in the storage tank when mounted to said body;
- said body having a throughbore extending axially therethrough to receive said tube and a threaded pocket at one end of said throughbore;
- said tube including a connector at one end disposed in said threaded pocket and having a threaded outer surface;
- a collar threadably engaging said threaded outer surface of said connector; and
- wherein said connector and said collar have opposing keyways.

12. A float gauge assembly as set forth in claim 11 including a key inserted into said keyways to rotationally lock said collar to said connector.

13. A float gauge assembly as set forth in claim 11 wherein the float mechanism includes a gear box connected to a float arm.

14. A float gauge assembly as set forth in claim 13 wherein said float mechanism includes a rotatable drive shaft rotatably driven through said gear box and rotatable within said tube as said float is raised or lowered by the material in the storage tank as the level of the material in the storage tank is raised or lowered.

15. A float gauge assembly as set forth in claim 14 including a hub fixed to an end of said drive shaft and a magnet fixed to said hub to rotate with said drive shaft and cooperate with said gauge.

16. A float gauge assembly comprising:
- a body for attachment to a port of a storage tank, said body having a throughbore extending therethrough and a threaded pocket at one end of said throughbore;
- a gauge mountable to said body, said gauge having a gauge face for indicating a level of material present in the storage tank;
- a float movable relative to said body in an operating position, said float being sized so that said float is unable to be inserted into the storage tank though the opening in the port;
- a tube coupled to said float and having a dimension sized for inserting through the opening in the port and said through bore and including a connector at one end disposed in said pocket and having a threaded outer surface;
- a collar threadably engaging said threaded outer surface of said connector;
- said connector and said collar have opposing keyways;
- a key disposed in said keyways to rotationally lock said collar to said connector; and
- said collar having a rear surface and a pair of pins diametrically opposed to one another protruding rearwardly from said rear surface and said body having a plurality of bores defined in said pocket of said body to receive said pins when said float has settled into an operating position while hanging down under a force of gravity in an empty storage tank so that said gauge face accurately indicates the level of material in the storage tank when mounted to said body.

17. A float gauge assembly as set forth in claim 16 including a retainer threaded into said pocket over said collar once said pins are in mating engagement with said bores of said body.

18. A float gauge assembly as set forth in claim 17 including a pair of fasteners threadably engaging said retainer to lock said retainer in position.

19. A float gauge assembly as set forth in claim 16 including a float arm connected to said float, a gear box connected to said float arm, and a rotatable drive shaft rotatably driven through said gear box and rotatable within said tube as said float is raised or lowered by the material in the storage tank as the level of the material in the storage tank is raised or lowered.

20. A float gauge assembly as set forth in claim 19 including a hub fixed to an end of said drive shaft and a magnet fixed to said hub to rotate with said drive shaft and cooperate with said gauge.

* * * * *

UNITED STATES PATENT AND TRADEMARK OFFICE
CERTIFICATE OF CORRECTION

| | | |
|---|---|---|
| PATENT NO. | : 9,562,800 B2 | Page 1 of 1 |
| APPLICATION NO. | : 14/207793 | |
| DATED | : February 7, 2017 | |
| INVENTOR(S) | : Frederick W. Blanchard et al. | |

It is certified that error appears in the above-identified patent and that said Letters Patent is hereby corrected as shown below:

In the Claims

Column 6, Line 3, Column 6, Line 42, Column 7, Line 20, and Column 8, Line 11:
Please delete "though" and replace it with: -- through --.

Signed and Sealed this
Sixth Day of June, 2017

Michelle K. Lee
*Director of the United States Patent and Trademark Office*